United States Patent [19]
Strickland et al.

[11] 3,765,226
[45] Oct. 16, 1973

[54] SELF-POWERED SAMPLE PROBE

[75] Inventors: Barney R. Strickland, Westfield; David W. Turner, Clark, both of N.J.

[73] Assignee: Esso Research and Engineering Company, Linden, N.J.

[22] Filed: June 23, 1971

[21] Appl. No.: 155,997

[52] U.S. Cl. .................................. 73/53, 73/422 R
[51] Int. Cl. ............................................. G01n 1/10
[58] Field of Search ................ 73/53, 61.1 R, 422 R

[56] References Cited
UNITED STATES PATENTS
3,625,065  12/1971  Thompson ........................ 73/422 R
2,592,464  4/1952  Plank ................................ 73/422 R
3,538,748  11/1970  Linsell et al. .................... 73/61.1 R Primary Examiner—Richard C. Queisser
Assistant Examiner—Joseph W. Roskos
Attorney—F. Donald Paris et al.

[57] ABSTRACT

A self-powered sample probe for providing a continuous flow of fluid to an analyzer is located with the fluid stream to be analyzed. The probe has an inlet facing upstream and return openings facing approximately ninety degrees on either side of the upstream inlet. The differential pressure head between the inlet and return openings is sufficient to provide continuous flow through the sample loop and external analyzer and to return the fluid back into the main stream.

1 Claim, 2 Drawing Figures

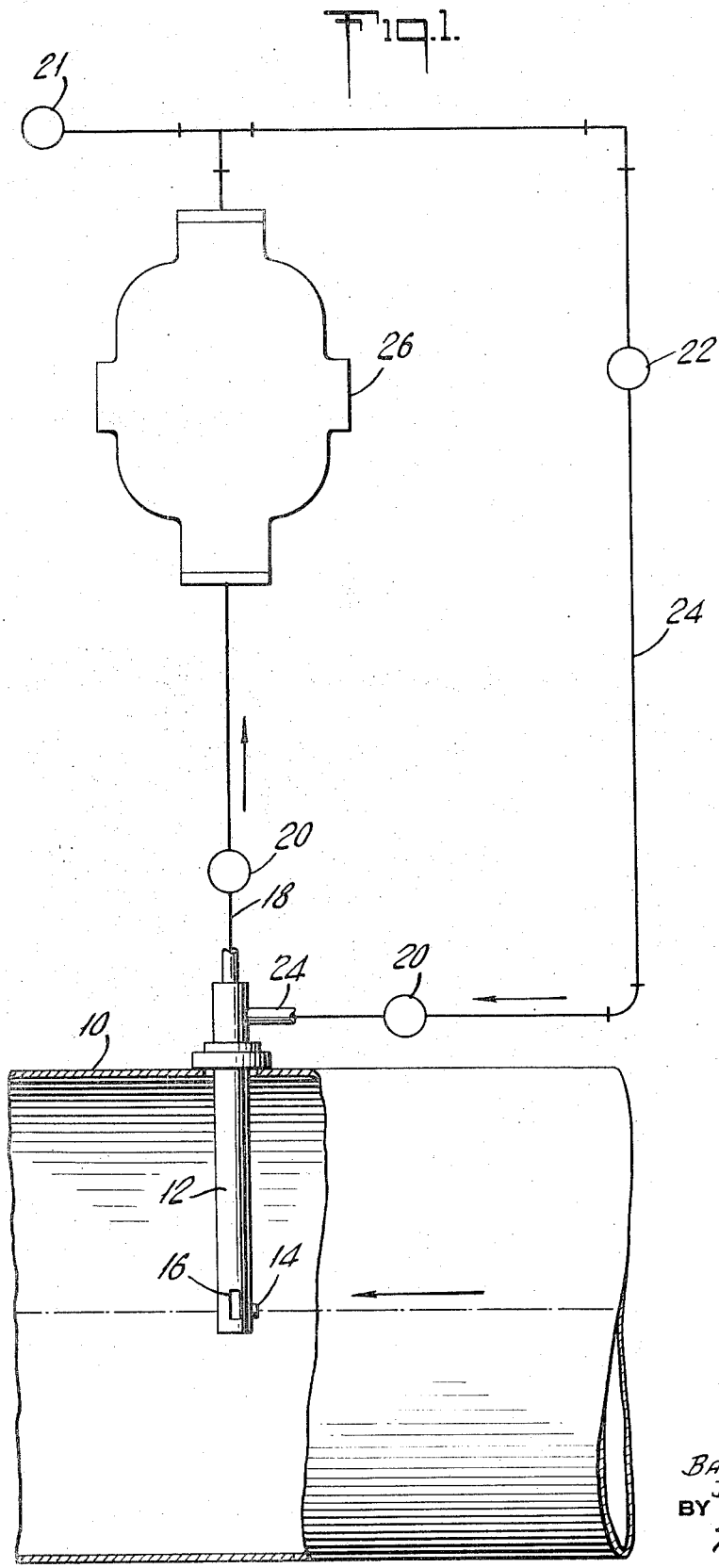

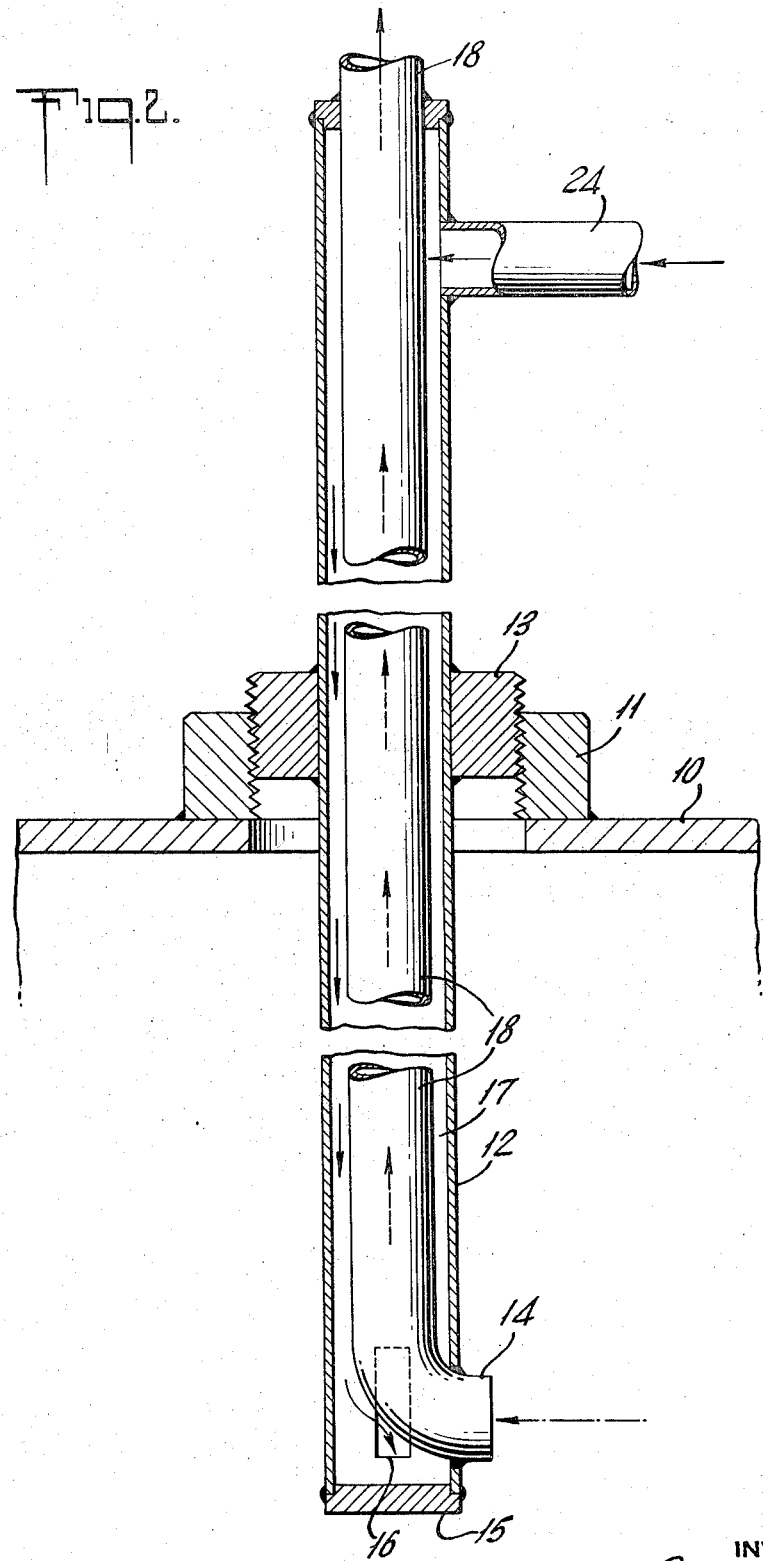

SELF-POWERED SAMPLE PROBE

BACKGROUND OF THE INVENTION

Continuous analysis of fluid streams flowing in piping is a very common application for analytical instruments in industrial processes and in pipeline transportation. The need for continuous analysis and recording of fluid properties becomes more important as quality control requirements become more restrictive. It becomes essential to know the quality of a given stream on a continuous basis in order to assure that no "off spec" products are produced and that waste materials meet established standards. To use an analyzer capable of continuous measurement of fluid properties generally is well known. They frequently are employed in plant and pipeline service. One of the problems which is encountered in the use of these analyzers is providing a sample to the analyzer which is truly representative of the stream itself. If the sample is not properly representative of the stream, erroneous readings may be obtained which then will mislead the operating personnel and cause them to make unnecessary, and, oftentimes, undesirable corrections to the stream's operating conditions. Therefore, providing a proper representative sample to the instrument, purging the instrument after the analysis, and disposing of the sample become significant factors in the design of such analytical equipment for industrial service.

Often the most practical method is to provide a continuous sample either to the analyzer itself, if the analyzer is capable of continuous analysis, or to provide a continuously flowing small or auxilliary sample loop from which a sample can be taken. The latter system is designed so that the delay time within the sampling loop is exceedingly small. Several approaches, as discussed briefly hereinafter, have been used to provide a continuously flowing sample loop. It is generally preferable to sample the fluid flowing in the main stream and then return it to the same stream again to avoid the problem of disposal. This necessitates the provision of a significant pressure differential in order to force the fluid through the sampling loop. It is possible to provide small pumps for this purpose, taking suction from the pipeline and then pumping the fluid through the analyzer or sample loop and then returning it to the pipeline. Such an approach is both complicated and expensive. Another prior art approach employed is to establish a natural pressure differential ($\Delta p$) in the main fluid stream. This often is done by taking a sample upstream of a pressure drop producing device, such as a valve or heat exchanger, passing the fluid through the sample loop and then returning it downstream of the pressure drop producing device. This approach is relatively less complex than the previously discussed prior art approach, but is not totally satisfactory since it restricts the possible locations for the analyzer and is economically undesirable to take energy from the main fluid stream by using such a pressure drop producing device.

In providing such a continuous sample loop, it is desirable to take flow from one point in a flowing stream and return it to that stream again without consuming energy by pressure drop or using an external power source. It is necessary that the sampling system be simple and relatively maintenance-free, and that there be no need to dispose of the sampled fluid. The present invention has these desired characteristics and obviates the foregoing discussed deficiencies of prior art systems by providing a relatively simple and novel device which provides sufficient pressure differential and is suitable for providing continuous flow to many types of analyzers. It will therefore provide all of the benefits desired in that a flow of fresh fluid will be available to the analyzer at all times, the fluid is simply disposed of after analysis, little energy is consumed, and the device represents no hindrance to the location or maintenance of the equipment such as would be required if the analyzer were located within the line.

SUMMARY OF THE INVENTION

The present invention provides a sample to an analyzer located within a loop situated externally of the conduit or pipe in which the fluid to be measured is flowing. The analyzer and the external loop are carefully designed to minimize the pressure drop within the system in order to accommodate the pressure drop available from the probe of the present invention. The analyzer loop is connected to the sample probe, said probe extending into the conduit carrying the main fluid stream and serving both as a receiving and return device in a single unit. The probe protrudes through the conduit wall to the approximate center of the conduit where it receives a uniform sample of the flowing stream. This disposition of the probe avoids withdrawing samples from stagnant areas, such as may be located along the wall of the conduit. The center location also provides the highest possible differential head since it is at the position of highest velocity. The probe itself consists of a pair of radially spaced concentric tubes creating an annular passage therebetween. The outer tube is closed at the bottom and the inner tube is connected through the wall of the outer tube to an inlet port or opening which faces upstream into the flowing stream. The outer tube is provided with two return ports which are located nominally ninety degrees on either side of the upstream inlet opening; that is, plus or minus ninety degrees away from the upstream point. The approximate maximum pressure head difference is obtained between the inlet and return openings.

The fluid to be measured enters the upstream inlet opening, passes through the inner one of the two tubes, circulates through the external analyzer loop, and returns to the probe passing through the annular space between the inner and outer tubes to exit into the conduit containing the main fluid stream through the return ports.

BRIEF DESCRIPTION OF THE DRAWINGS

FIG. 1 shows a probe constructed according to the present invention in use in a pipeline wherein fluid is sampled from the line, circulated through an external analyzer loop and returned to the pipeline.

FIG. 2 shows details of a sample probe per se according to the present invention.

DESCRIPTION OF THE PREFERRED EMBODIMENT

FIG. 1 illustrates the use of the probe which is the subject of the present invention. The probe 12 is positioned in a typical pipeline 10 having a stream of fluid flowing therethrough. It extracts a sample from the stream, circulates the sample continuously through an external analyzer loop and returns the sample to the pipeline through the same probe. In FIG. 1 the flow is from right to left. The sample probe has an inlet port 14 which faces upstream into the flowing fluid. A predetermined amount of the stream enters through the inlet port 14 into an inner tube (see FIG. 2), the amount of the sample depending upon the size of the inlet port and the available pressure differential. The sample leaves the probe 12 via supply line 18. The fluid passes through the analyzer 26 or, alternativey, bypasses the analyzer itself, and returns to the pipeline 10 again via the visual flow indicator 22 and the return line 24. The fluid returns through the annular space between the inner flow tube and the outer tube of the probe 12 (see FIG. 2), exiting from re-entry slots 16 radially located 90° on either side of the entrance port 14. Also illustrated are valves 20 which are required to isolate the circulation loop, and temperature measuring member 21 which would be used to indicate the temperature of the fluid being measured by the analyzer. Other instrumentation could, of course, be used depending upon the type of analyzer which is applied in the particular circumstances. As suggested above, some analyzers which use discrete samples would be located to the side of the circulating loop and admit samples for analysis intermittently. A typical application is the use of the probe 12 in an oil pipeline for measurement of moisture content by a hazemeter. This is a continuous analyzer and the circulation loop incorporates the analyzer itself as shown in FIG. 1.

Although the probe is particularly intended to provide a sample to an external analyzer, the analyzer is not needed to practice the invention. A circulating loop, as provided by the probe, may be constructed for convenient withdrawal of samples for routine laboratory analysis.

Having seen the application of the novel probe of the present invention in FIG. 1, the details of a typical embodiment of said probe are illustrated in FIG. 2. The probe comprises two concentric tubes 12 and 18. The inlet tube 18 is located inside the return tube 12 to define the annular return passage 17 between them. The outer tube 12 is welded into a sleeve 13 which is threaded into coupling 11 which is secured by means of a weld to the wall of pipe 10. Flow, traveling from right to left as in FIG. 1, enters the inlet port 14, passes upwardly through the inner tube 18 exiting from the probe into the analyzer 26 disposed within the sample loop illustrated in FIG. 1. The return flow passes from line 24 into the annular space 17 between tubes 18 and 12 passing downwardly through the space 17, exiting from the probe through exit or re-entry ports 16 disposed at substantially 90° on either side of the inlet port 14. The flow is prevented from exiting through the end of the pipe by means of a plug 15.

While the return ports 16 preferably are shown as being disposed at 90° relative to the inlet port 14, they could be slightly displaced from that position. The 90° position is chosen as being approximately the optimum point for development of maximum pressure differential between the inlet port 14 and the exit ports 16. Measurements of the pressure of streams flowing around cylinders such as are disclosed, among other sources, in "Momentum, Heat, and Mass Transfer", Bennett and Myers, 1962 McGraw-Hill, p. 72 FIG. 8-4 indicate that the point of maximum pressure differential may be slightly less than 90° at lower Reynolds numbers characterized by a viscous boundary layer at the surface of the probe. The 90° position is indicated in the same reference to give the maximum pressure differential when at higher Reynolds numbers a turbulent boundary layer is present. The reference figure also indicates the value of locating the exit ports at the 90° position rather than at 180° away from the inlet. The use of 90° exits provides the maximum differential head especially at higher Reynolds numbers typically used in industrial practice. At high velocities either 90° or 180° might be used since more velocity head is available but it has been found that at lower velocities the location of exits at 90° away from the inlet may make possible adequate flow while the 180° position was not satisfactory.

For example, tests have shown that in commercial pipe lines flowing oil that at liquid velocities in the order of 12 feet per second that insufficient pressure differential is developed between an entrance port facing upstream and an exit port 180° away, whereas when the ports are located at the 90° position, sufficient pressure differential is available in order to use the probe in the manner indicated.

The scope of the invention is disclosed by the claims which follow since modifications to the preferred embodiment are possible without departing from the spirit of the invention.

What is claimed is:
1. Means for continuously analyzing a flowing fluid comprising:
   a. a probe for sampling said flowing fluid having:
      1. an entrance facing upstream into the direction of the flow of the fluid;
      2. a first passageway connected to said entrance;
      3. an exit located at about pulse or minus ninety degrees relative to said entrance, thereby achieving the maximum pressure differential between said inlet and said outlet;
      4. a second passageway connected to said exit;
   b. analyzer means operably communicating with said sample probe whereby a portion of said flowing fluid may be analyzed, said analyzer means being operably connected to said first and second passageways in said probe, said analyzer means being operative only when the maximum pressure differential of (a) is available.

* * * * *